(12) United States Patent
Rohman

(10) Patent No.: US 10,677,285 B2
(45) Date of Patent: Jun. 9, 2020

(54) DEVICE HINGES

(71) Applicant: Hewlett-Packard Development Company, L.P., Houston, TX (US)

(72) Inventor: Stephen Thomas Rohman, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 15/774,211

(22) PCT Filed: Mar. 4, 2016

(86) PCT No.: PCT/US2016/021052
§ 371 (c)(1),
(2) Date: May 7, 2018

(87) PCT Pub. No.: WO2017/151149
PCT Pub. Date: Sep. 8, 2017

(65) Prior Publication Data
US 2018/0328402 A1    Nov. 15, 2018

(51) Int. Cl.
*G06F 1/16* (2006.01)
*H05K 5/00* (2006.01)
*H05K 7/00* (2006.01)
*F16C 11/12* (2006.01)
(Continued)

(52) U.S. Cl.
CPC .............. *F16C 11/12* (2013.01); *F16C 11/10* (2013.01); *G06F 1/1601* (2013.01); *H04N 1/00* (2013.01); *H04N 1/00554* (2013.01); *G06F 2200/1612* (2013.01)

(58) Field of Classification Search
CPC .... G06F 1/1601; G06F 1/1603; G06F 1/1679; G06F 1/1681; G06F 1/1632; H04N 1/00554; H04N 1/00519; F16C 11/10; F16C 11/103; F16C 11/12
See application file for complete search history.

(56) References Cited

U.S. PATENT DOCUMENTS

| 5,180,232 A | 1/1993 | George et al. |
| 5,513,922 A | 5/1996 | Umbach |
| 7,126,816 B2 | 10/2006 | Krah et al. |

(Continued)

FOREIGN PATENT DOCUMENTS

| JP | 2000214788 A | 8/2000 |
| KR | 20-2000-0000579 U | 1/2000 |
| KR | 10911651 B1 | 8/2009 |

OTHER PUBLICATIONS

Premier AL Panel Printer Manual Author/Date Unknown~4 pages.

*Primary Examiner* — Anthony M Haughton
(74) *Attorney, Agent, or Firm* — HP Inc. Patent Department

(57) ABSTRACT

In an example, a device hinge may include a hinge member to rotatably engage a device feature to a device. The device hinge may further include a cam element having a cam ramp and a cam face. The cam face may engage with the device feature in a stowed position. The device feature may further include a bias member and an ejector. The ejector may move the device feature from the stowed position to an ejected position, and the bias member may move the device feature to the ejected position such that a clearance gap is created in between a surface of the device feature and a surface of the device.

14 Claims, 6 Drawing Sheets

(51) Int. Cl.
 *H04N 1/00* (2006.01)
 *F16C 11/10* (2006.01)

(56) References Cited

U.S. PATENT DOCUMENTS

| | | | |
|---|---|---|---|
| 7,758,117 B2* | 7/2010 | Chang | B60R 11/0235 297/217.1 |
| 7,762,627 B2* | 7/2010 | Chang | B60R 11/0235 297/217.3 |
| 8,449,031 B2* | 5/2013 | Chang | B60R 11/0235 297/217.3 |
| 9,586,532 B1* | 3/2017 | Gough | B60R 11/0235 |
| 2005/0239037 A1 | 10/2005 | Lertsithichai et al. | |
| 2006/0082958 A1 | 4/2006 | Fujiwara | |
| 2007/0008685 A1* | 1/2007 | Hsiung | G11B 33/025 361/679.27 |
| 2007/0052618 A1* | 3/2007 | Shalam | B60R 11/0235 345/7 |
| 2008/0252118 A1* | 10/2008 | Chang | B60R 11/0235 297/217.3 |
| 2010/0265179 A1 | 10/2010 | Pranil et al. | |
| 2011/0133530 A1* | 6/2011 | Chang | B60R 11/0235 297/217.3 |
| 2017/0123205 A1* | 5/2017 | Quiroz De La Mora | G02B 27/0149 |

* cited by examiner

DEVICE HINGES

BACKGROUND

Electronic devices may include a device that a user may interact with. The user may interact with such a device in order to control, manipulate, or adjust the function of the electronic device in some way. The disposition of such a device may be physically adjustable to make user interaction easier or more convenient. Further, such a device may be able to be stowed into the electronic device.

DETAILED DESCRIPTION

Electronic devices, such as computing or imaging devices in some situations, may include a device or a device feature that a user may interact with. The user may interact with such a device feature in order to control, manipulate, or adjust the function of the electronic device in some way. The disposition of such a device feature may be physically adjustable to make user interaction with the electronic device easier or more convenient. Further, such a device feature may be able to be stowed into the electronic device. The device feature may also be able to be ejected from such a stowed position, and then further adjusted for ease of user interaction.

In some situations, it may be desirable to stow the device feature within the electronic device, or, further, stow the device feature such that it lays flat or flush with the surrounding panels or portions of the electronic device. Further, it may be desirable to be able to eject the device feature from the stowed position. Additionally, once ejected, it may be desirable to be able to adjust the angle of the device feature, relative to the surrounding panels or portions of the electronic device, so as to improve the ability for a user to interact with the device feature, or, in other words, to change the operating angle of the device feature. In some situations, it may be desirable to be able to eject the device feature, and adjust the angle of the device feature, while avoiding contact or interference between the device feature and any surrounding panels or portions of the electronic device.

In such a situation, the device feature may stow or nest into a cavity within the electronic device, but the cavity may include clearance gaps surrounding the device feature, so as to provide the necessary clearance to avoid interference between the device feature and the electronic device. In order to avoid such interference, the cavity may include clearance gaps that are unaesthetic or that break up and hinder the industrial design of the electronic device.

Implementations of the present disclosure provide device hinges that allow a device feature to nest or stow within a device, or an electronic device, while minimizing the size and negative aesthetic appearance of clearance gaps around the device feature. The device feature may be able to stow within the electronic device in a fashion that is flat or flush with the surrounding portions of the electronic device. Further, the device feature may be able to be ejected from the stowed position, and further adjusted without contacting or interfering with the electronic device, or surrounding panels or portions thereof.

Figure 1A:
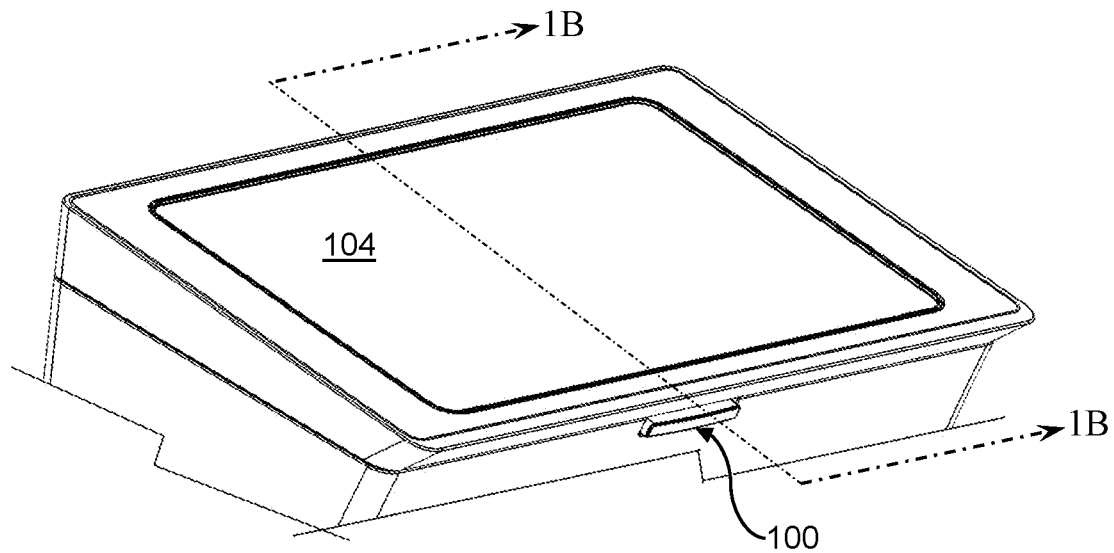
FIG. 1A is a perspective view of an example device comprising an example device hinge.
Figure 1B:
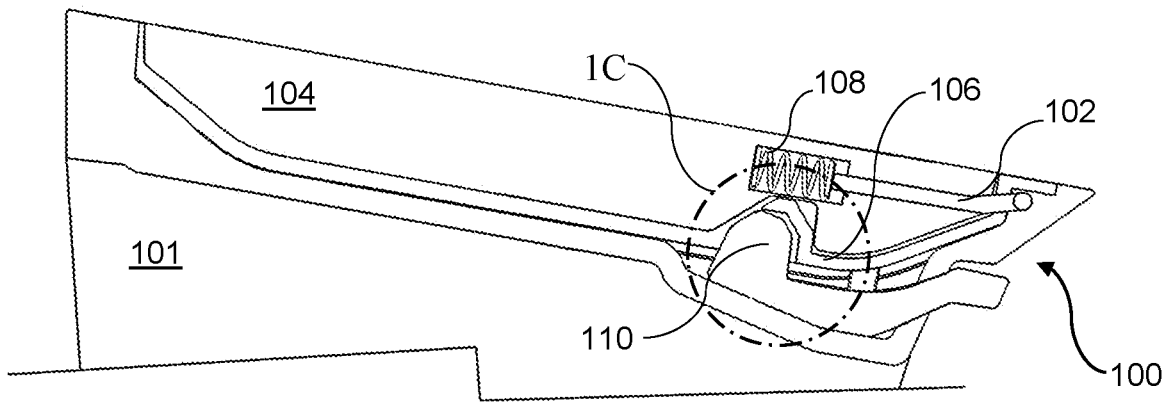
FIG. 1B is a cross-sectional view of an example device comprising an example device hinge.

Referring now to FIG. 1A, a perspective view of an example device having an example device hinge 100 and a device feature 104 is illustrated. Referring additionally to FIG. 1B, a cross-sectional view of the example device hinge 100 is illustrated wherein the device feature 104 is disposed in a stowed position within the device 101. The example device hinge 100 may include a hinge member 102, a cam element 106, a bias member 108, and an ejector 110. The device 101 may be an electronic device, or, further, a computing device, in some implementations. Further, the device 101 may be an imaging or printing device in some implementations, including a two-dimensional (2D) or three-dimensional (3D) printer. In further implementations, the device may be a scanner or a copier, or some other form of imaging device. The device feature 104 may be a portion of, or an accessory to, the device 101 that a user of the device 101 may interact with. In some implementations, the user may interact with the device feature 104 in order to control, manipulate, or adjust a function of the device 101. In further implementations, the device feature 101 may be an information display, status indicator, or control panel of the device 101. In yet further implementations, the device feature 104 may be a component for displaying a label or other source of information, or another component of which a user may wish to adjust the disposition or angle.

The device hinge 100 may include a hinge member 102, in some implementations. The hinge member may be a rigid or semi-rigid component that rotatably engages the device feature 14 to the device 101. In some implementations, the hinge member 102 may rotatably engage the device feature 104 with the device 101 about a pivot point, such that the device feature 104 may swing, articulate, or otherwise be rotatable relative to the device 101 by way of its engagement with the hinge member 102. In some implementations, the device feature 104 may be movable from the stowed position to an ejected position, and vice versa about the pivot point by way of the hinge member 102. Additionally, the hinge member 102 may be movably or slidably engaged with the device feature 104, in some implementations. In other words, the device feature 104 may be capable of sliding along, or otherwise moving relative to, the hinge member 102. In further implementations, the device feature 104 may be capable of sliding along the hinge member 102, or relative to the hinge member 102, in a direction away from the pivot point.

Figure 1C:
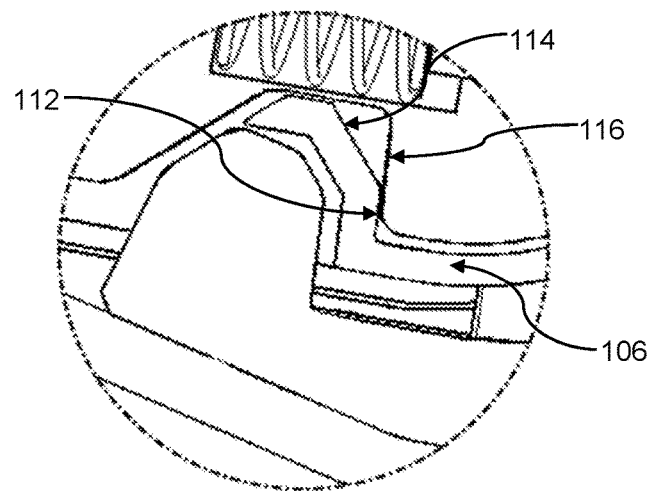
FIG. 1C is a detail view of an example device hinge.

The device hinge 100 may further include a cam element 106. In some implementations, the cam element 106 may be a protrusion from the device 101, including a surface or series of surfaces. The cam element 106 may engage with the device feature 104, or, in some implementations, the cam element 106 may engage with a rear surface of the device feature 104. Referring additionally to FIG. 1C, a detail view of the cam element 106 is illustrated. The cam element 106 may include a cam face 112 and a cam ramp 114, wherein, in some implementations, the cam ramp 114 may extend away from the cam face 112 at an oblique angle. In other implementations, the cam ramp 114 may extend away from the cam face 112 at a right angle. In some implementations, the cam ramp 114 may be a separate component from the cam face 112 and/or the cam element 106, and, further, may be disposed apart from the cam face 112. In further implementations, the cam face 112 may be substantially parallel to a direction of travel, or substantially tangent to an arc of travel of the device feature 104, the device feature 104 to move along the direction or arc of travel from the stowed position to the ejected position, and vice versa. In this context, the terms substantially parallel or substantially tangent to the direction or arc of travel may refer to the cam face 112 being positioned relative to the device feature 104, such that when the device feature 104 is engaged with the cam face 112 in the stowed position, e.g., a portion of the device feature 104 is pushed against the cam face 112, the cam face 112 may maintain, hold, or keep the device feature in the stowed position. In further implementations, the device feature 104 may include a lock face 116 to engage with the cam element 106, or, more specifically, with the cam face 112 and the cam ramp 114.

The device hinge 100 may further include a bias member 108, in some implementations. The bias member 108 may be a resilient component capable of elastic deformation, or, in other words, capable of returning to its original shape or geometry after being deformed. To achieve such elastic properties, the bias member 108 may include a material having an appropriate composition. Such a material may, in some implementations, be a spring steel, aluminum, or plastic. In some implementations, the bias member 108 may be a coil spring, as depicted in FIG. 1B. In other implementations, the bias member 108 may be another type of spring having a different geometry, such as a tension spring, or a torsion spring. In further implementations, the bias member 108 may exert a resistive normal force in response to being deformed. The normal force may be exerted in a direction opposite to that of the deformation, and, further, the normal force may be proportional and/or progressively proportional to the amount or degree of deformation.

The bias member 108 may be engaged with the device feature 104 and with the hinge member 102, in some implementations. The bias member 108 may be operably disposed in between the hinge member 102 and the device feature 104, in some implementations. In further implementations, the bias member 108 may be integrated into the hinge member 102 or the device feature 104, or otherwise structurally disposed within, or part of, the hinge member 102 or the device feature 104. In some implementations, the bias member 108 may bias, urge, or exert a force on the device feature and/or the hinge member 102. The force exerted may be a resistive normal force in response to the bias member 108 experiencing deformation or pretension. The bias member 108 may bias the device feature 104 in a direction away from the pivot point, in some implementations. Correspondingly, in some implementations, the bias member 108 may urge or bias the hinge member 102 in a direction towards the pivot point. In further implementations, the bias member may be partially or wholly compressed in between the hinge member 102 and the device feature 104 when the device feature 104 is in the stowed position, as illustrated in FIG. 1B. Accordingly, the bias member 108 may urge or push the device feature 104, or a lock face 116 thereof, against the cam face 112 of the cam element 106 when the device feature 104 is in the stowed position. This exerted force against the cam face 112 may maintain, keep, or hold the device feature 104 in the stowed position.

The device hinge 100 may further include an ejector 110. The ejector 110 may be a rigid or semi-rigid component that may be movably disposed within the device 101, or in some implementations, within the device feature 104. The ejector 110 may include a surface or a series of surfaces to engage with a complementary surface or series of surfaces on the device feature 104. In some implementations, the ejector 110 may engage with a feature, surface, or series of surfaces that are disposed on a rear surface, side, end, or panel of the device feature. In further implementations, the ejector 110 may engage with a cavity on the rear side of the device feature 104, or a feature disposed within a cavity on the rear side of the device feature 104. The ejector 110 may be disposed such that it may move the device feature 104 from the stowed position to the ejected position. Further, the ejector 110 may move lock face 116 of the device feature from engagement with the cam face 112 to engagement with the cam ramp 114.

Figure 2A:
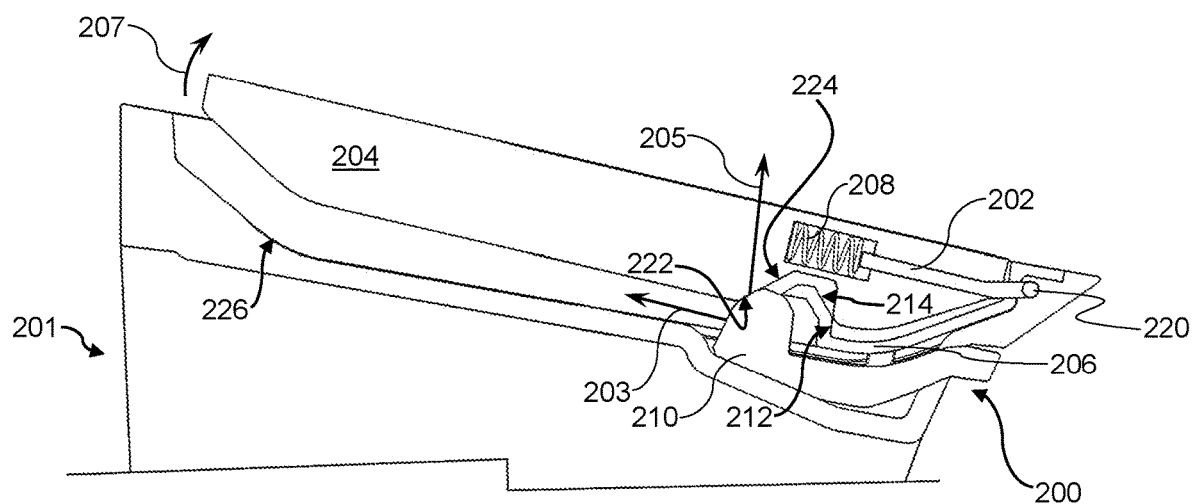
FIG. 2A is a cross-sectional view of an example device comprising an example device hinge.

Referring now to FIG. 2A, a cross-sectional view of an example device hinge 200, disposed within an example device 201 is illustrated. Example device hinge 200 may be similar to example device hinge 100. Further, the similarly named elements of example device hinge 200 may be similar in function and/or structure to the elements of example device hinge 100, as they are described above. FIG. 2A depicts example device hinge in a state wherein a device feature 204 is partially ejected from the device 201. An ejector 210 has engaged with the device feature 204 such that the device feature 204 has been moved from an engagement with a cam face 212, and is transitioning to engagement with a cam ramp 214, the cam face 212 and the cam ramp 214 being components of a cam element 206. More specifically, the ejector 210 may include an actuation face 222 to engage with a complementary actuation ramp 224 disposed on the device feature 204. The actuation face 222, as well as the actuation ramp 224 may each be disposed at an oblique angle relative to the cam face 212. As such, as the actuation face 222 engages with actuation ramp 224 in a forward direction 203, the device feature 204 may move along a direction 205, as depicted in FIG. 2A, for example. Such a motion of the device feature 204 may, in some implementations, result in the device feature 204 moving along an opening arc 207, about a pivot point 220. The device feature 204 may move along direction 205, and thus arc 207, until the device feature 204, or a lock face thereof, for example, travels the length of the cam face 212, and reaches a transition point between cam face 212 and cam ramp 214.

Figure 2B:
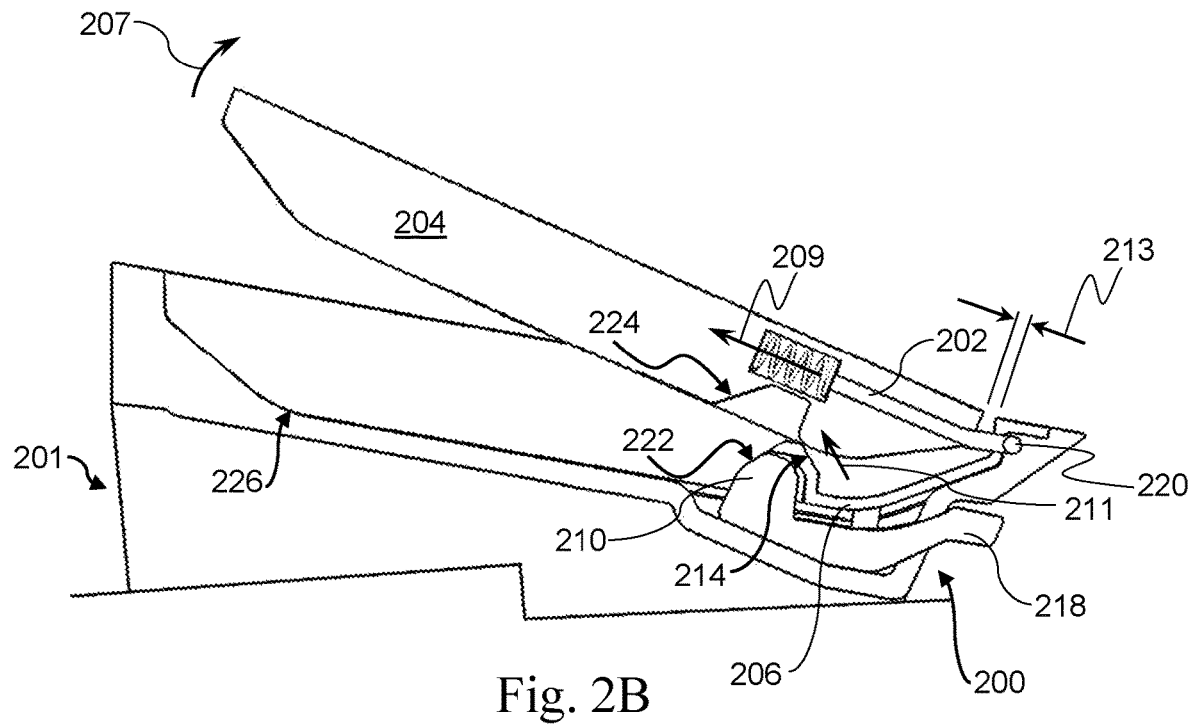
FIG. 2B is a cross-sectional view of an example device comprising an example device hinge.
Figure 2C:
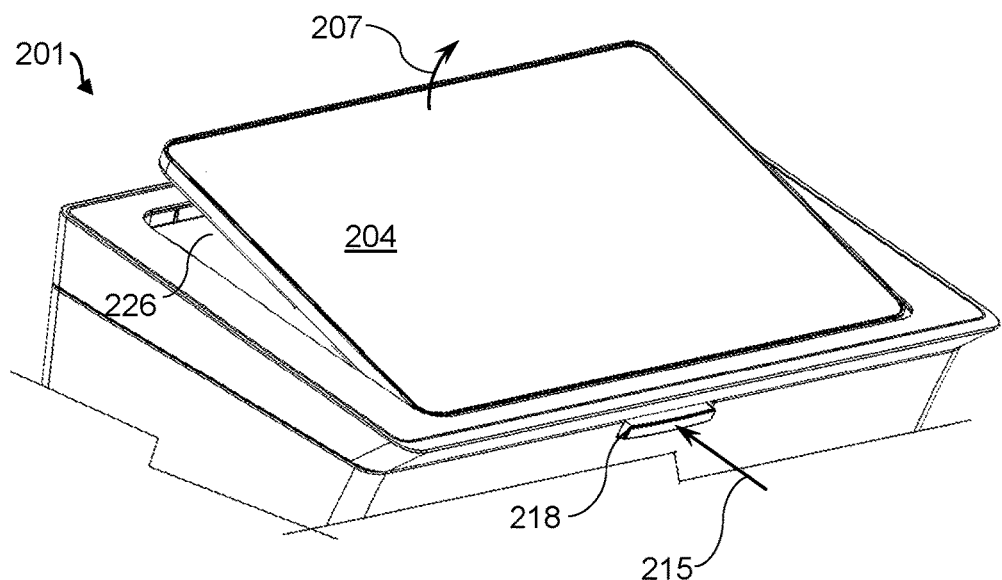
FIG. 2C is a perspective view of an example device comprising an example device hinge.

Referring now to FIGS. 2B-C, a cross-sectional view, as well as a perspective view of an example device hinge 200 is illustrated wherein the device feature 204 is disposed in an ejected position. As compared to the depiction of the device hinge 200 of FIG. 2B, the ejector 210 has transitioned the device feature 204 from engagement with the cam face 212 to engagement with the cam ramp 214. Upon the transition from the cam face 212 to the cam ramp 214, in some implementations, the bias member 208 may move the device feature 204 to the ejected position as illustrated in FIG. 2B. In further implementations, the bias member 208 may move, or slide for example, the device feature 204 from the point of transition to the cam ramp 214, upwards along the cam ramp 214 to the ejected position. The bias member 208 may exert a force against the device feature 204 along direction 209, for example, thus moving the device feature 204, or the lock face thereof, along the cam ramp 214 to the ejected position. The force exerted by the bias member 208 may be the result of a compression or pretension of the bias member 208 when the device feature 204 is disposed in the stowed position, in some implementations. The bias member 208 may exert the force on the device feature 204, and a complementary normal force on the hinge member 202, in some implementations. In other words, the bias member 208 may exert a force in both directions along direction 209 to push the device member 204 away from the hinge member 202, such that, as the device feature 204 moves upward along the cam ramp 214, the device feature 204 moves or slides relative to the hinge member 202 along direction 209. The bias member 208 may slide the device feature 204 along the cam ramp 214 in direction 211 such that, by virtue of the oblique angle of the cam ramp 214, the device feature 204 also rotates along ejection arc 207, about pivot point 220, to the ejected position.

In some implementations, the device hinge 200, or the device 201 in other implementations, may include a cradle 226. The cradle 226 may be a cavity, well, orifice, or other suitable receptacle in the device 201 to receive the device feature 204, when the device feature 204 is in the stowed position. In some implementations, the device feature 204 may nest within the cradle 226 in the stowed position, such that the device feature 204 is substantially flush with a top surface of the device 201. In this context, substantially flush may refer to a condition where the device feature 204 is received or disposed within the cradle 226 to such a degree where the device feature 204 is or appears functionally and aesthetically even or flat with the surrounding portions or panels of the device 201. In some implementations, the cam element 206 may be disposed within the cradle 226, and may engage with a rear surface of the device feature 204 within the cradle 226. In some implementations, the cam element 206 may be an integrated part of the cradle 226, or part of the same component that defines the cradle 226.

In some implementations, as the device feature 204 is moved along the cam ramp 214, a clearance gap 213 may be created or defined by a surface of the device feature 204 and a surface of the device 201. In further implementations, an edge of the device feature 204 and an edge of the device 201 define the clearance gap 213 when the device feature 204 is in the ejected position. In yet further implementations, a bottom edge of the device feature 204 and a front edge of the cradle 226 create or define the clearance gap 213, as illustrated in FIG. 2B, when the device feature 204 is in the ejected position.

In some implementations, the device 201 may include a device ejection button 218. The device ejection button 218 may be a button, knob, lever, or other feature that a user of the device 201 may push, turn, actuate, or otherwise engage with. In some implementations, the device ejection button 218 may be disposed on an exterior panel or portion of the device 201, and in further implementations, may be disposed in close proximity to the device feature 204. In some implementations, the ejector 210 may be coupled to the device ejection button 218. In this context, coupled may refer to a direct mechanical or electrical coupling, or an indirect coupling through one or more intermediary components. In some implementations, the ejector 210 may be coupled to the device ejection button 218 such that, upon the device ejection button 218 being actuated, the ejector 210 may move the device feature 204 from the stowed position to the ejected position. In further implementations, for example, referring to FIGS. 2A and 2C, upon the device ejection button 218 being pushed or actuated in an example manner 215, the ejector 210 may move in a direction 203, causing the device feature 204 to move from the stowed position to the ejected position.

It should be noted that, although the Figures portray the ejector 210 and cam element 206 as being disposed within the device 201, and not being disposed within the device feature 204, other dispositions or orientations are possible. For example, in some implementations, the ejector 210 may move and pivot with, and be a part of, the device feature 204. In such an implementation, the ejector 210 may engage with a feature, cavity, or surface on the device 201, or, further, within a cradle 226 therein, so as to move the device feature 204 from the stowed position to the ejected position.

In some implementations, the device feature 204 may move from the ejected position to the stowed position. Such a movement may happen in the reverse order of which the device feature 204 moved from the stowed position to the ejected position. For example, an outside force may urge or push down on the device feature 204 so as to cause the device feature 204, or a lock face or other surface thereon, to move or slide downwards along the cam ramp 214. As the device feature 204 moves downward along the cam ramp 214, the oblique nature of the geometry of the cam ramp 214 may cause device feature 204 to move or slide relative to the hinge member 202, in a direction opposite that of direction 209. Therefore, as the device feature 204 moves downward along the cam ramp 214, the bias member 208 may be compressed. Further, the outside force may move the device feature downwards along the cam ramp 214 until the device feature 204 engages with the cam surface 212 in the stowed position. Upon engaging with the cam surface 212, the bias member 208 may push the device feature 204 against the cam face 212 so as to maintain or keep the device feature 204 in the stowed position. The outside force may be, in some implementations, a force exerted by a user of the device 201. In other implementations, the outside force may be a force or urging exerted by another component engaged with the device feature 204.

Figure 3A:
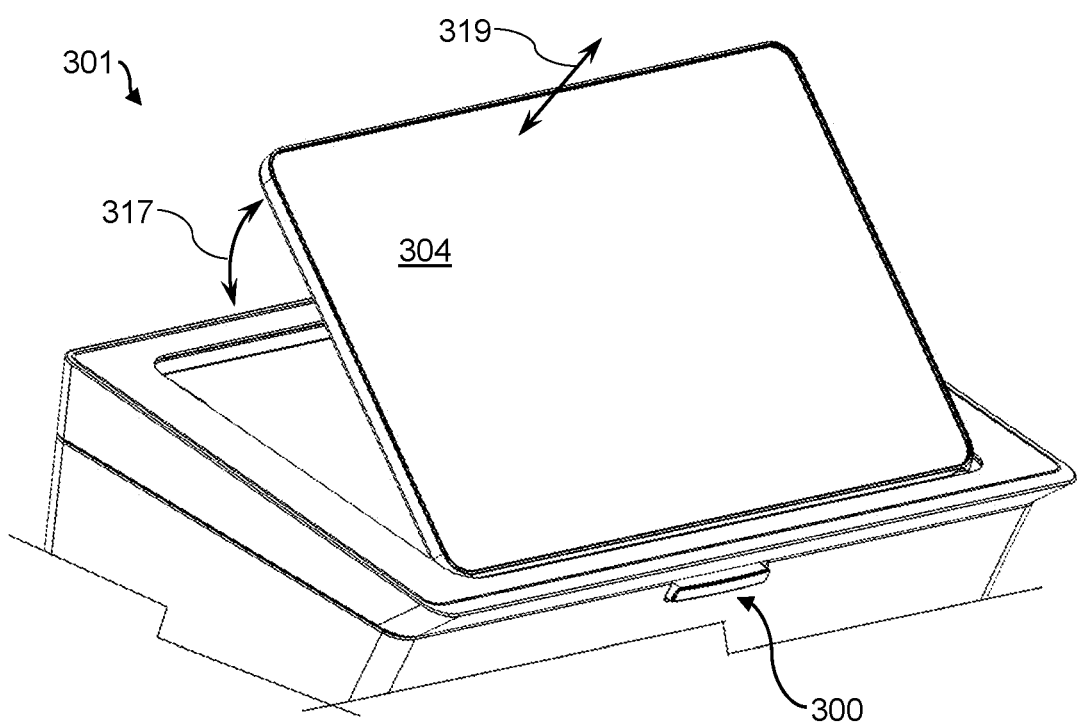
FIG. 3A is a perspective view of an example device comprising an example device hinge.
Figure 3B:
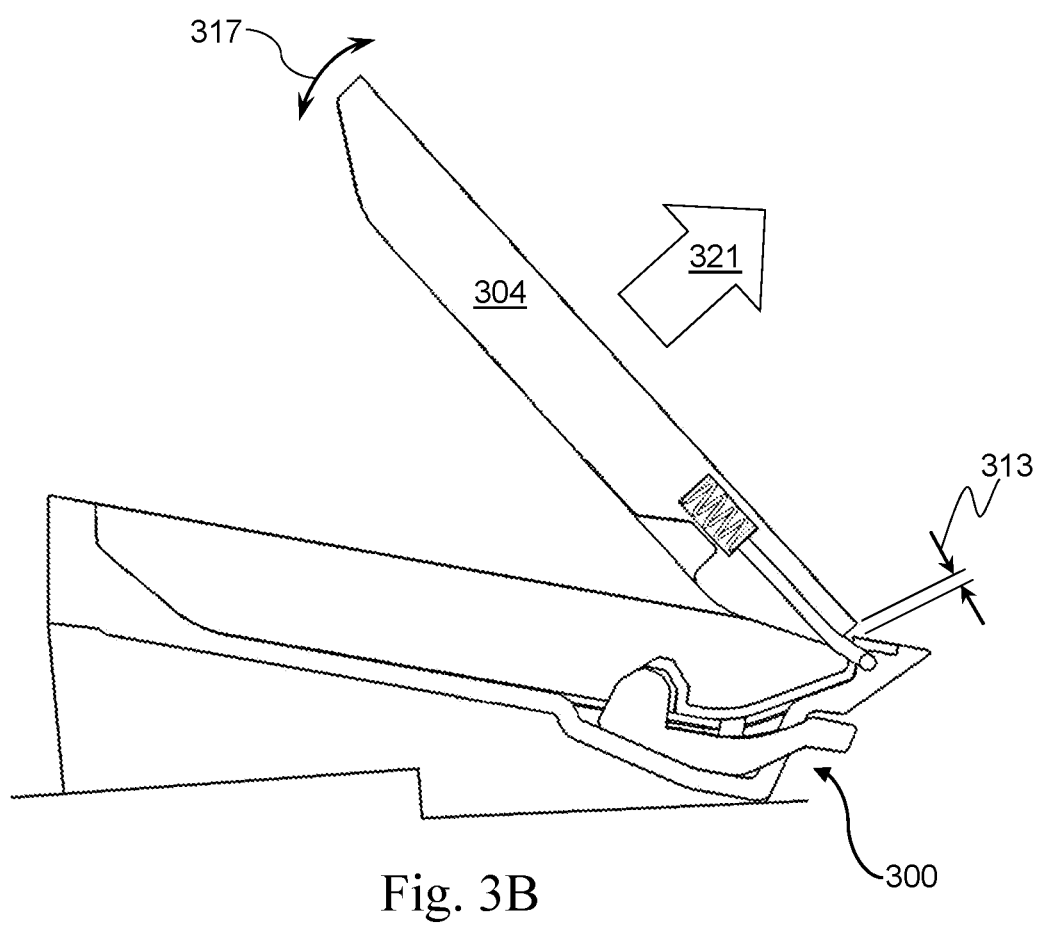
FIG. 3B is a cross-sectional view of an example device comprising an example device hinge.

Referring now to FIGS. 3A-B, a perspective and cross-sectional view of an example device hinge 300 disposed within an example device 301 is illustrated, wherein a device feature 304 is shown as being in an adjustable ejected position. Example device hinge 300 may be similar to example device hinge 100 or 200. Further, the similarly named elements of example device hinge 300 may be similar in function and/or structure to the elements of example device hinge 100 or 200, as they are described above. As illustrated in FIGS. 3A-B, the device feature 304 may have been moved from a stowed position, to an ejected position, as such function is described above. In some implementations, once in the ejected position, the disposition, angle, or another ejection attribute, such as ejection depth, of the device feature 304 may further be adjustable. Such an ejection attribute, such as a viewing angle, for example, may be adjustable in order to change the manner of engagement with the device feature 304 by a user. Further, the device feature 304 may be rotatable or translatable relative to the device 301 about a pivot point when the device feature 304 is in the ejected position. In other words, a user may adjust the angle or ejection distance of the device feature 304 in order to better interact or view 321 the device feature 304. For example, a user may manually move the device feature 304 in an example direction 319 so as to change the ejection angle 317 of the device feature 304.

It should be noted that, in some implementations, the transition of the device feature 304 from a stowed position to an ejected position may create or define a clearance gap 313 between the device feature 304 and the device 301. Such a clearance gap 313, in some implementations, may be maintained throughout an entire adjustment range 317 of the device feature 304 so as to avoid any interference or contact between the device feature 304 and the device 301.

Figure 4:
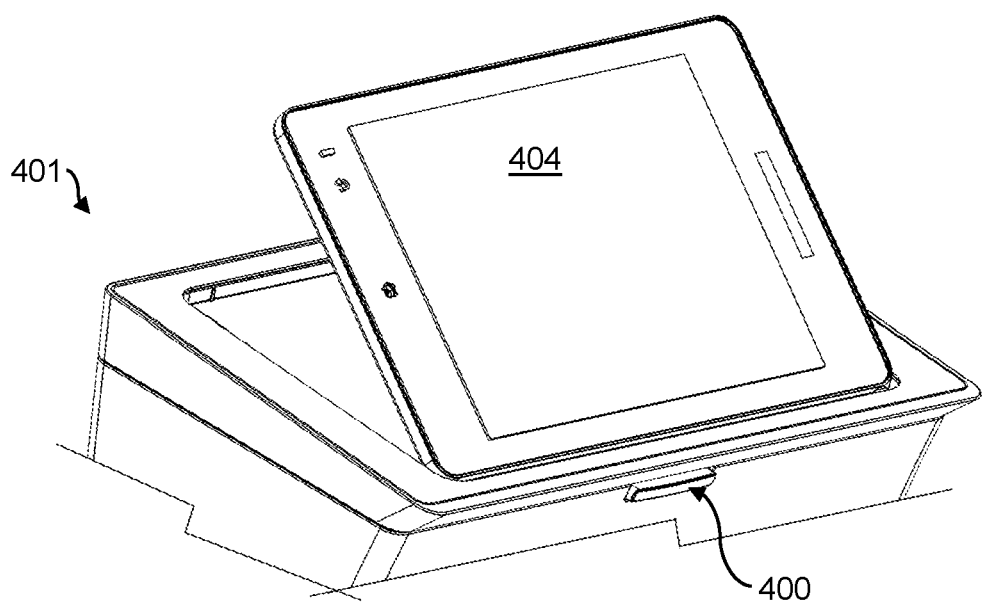
FIG. 4 is a perspective view of an example device comprising an example device hinge.

Referring now to FIG. 4, a perspective view of an example device hinge 400 disposed within an example device 401 is illustrated. In some implementations, the device 401 may be an imaging device. Further, the imaging device 401 may include a device feature 404, which may be a control panel 404 of the imaging device, in some implementations. Such a control panel 404 may include a display, touch screen display, buttons, knobs, indicators, speakers, microphone, and/or other components that may found on a control panel, in some implementations.

What is claimed is:

1. A device hinge, comprising:
 a hinge member to rotatably engage a device feature to a device;
 a cam element, comprising:
  a cam ramp; and
  a cam face to engage with the device feature in a stowed position;
 a bias member; and
 an ejector to move the device feature from the cam face to the cam ramp in order to move the device feature from the stowed position to an ejected position, wherein the bias member is to move the device feature along the cam ramp to move the device feature to the ejected position such that a clearance gap is created in between a surface of the device feature and a surface of the device.

2. The device hinge of claim 1, further comprising a cradle to receive the device feature in the stowed position, the device feature to engage with the cam face of the cam element when in the stowed position to maintain the device feature in the stowed position within the cradle.

3. The device hinge of claim 2, wherein the cam element is disposed on the cradle, the cam element to engage with a rear surface of the device feature.

4. The device hinge of claim 2, wherein the device feature is to be substantially flush with a top surface of the device when in the stowed position.

5. The device hinge of claim 1, wherein the ejector is coupled to a device ejection button such that, upon the device ejection button being actuated, the ejector is to move the device feature from the stowed position to the ejected position.

6. A device hinge, comprising:
 a hinge member slidably engaged with a device feature, the hinge member to rotatably engage the device feature with a device about a pivot point;
 a bias member to bias the device feature in a direction away from the pivot point;
 a cam element to engage with the device feature, comprising:
  a cam ramp; and
  a cam face to engage with the device feature in a stowed position; and
 an ejector to move the device feature from cam face in the stowed position to the cam ramp in an ejected position.

7. The device hinge of claim 6, wherein the bias member is to move the device feature upwards along the cam ramp to the ejected position.

8. The device hinge of claim 7, wherein the device feature is rotatable relative to the device about the pivot point when the device feature is in the ejected position.

9. The device hinge of claim 8, wherein an edge of the device feature and an edge of the device define a clearance gap when the control panel is in the ejected position.

10. The device hinge of claim 9, wherein the device feature may be urged from the ejected position to the stowed position by an outside force such that the device feature moves downwards along the cam ramp until the cam face engages with the device feature in the stowed position.

11. The device hinge of claim 6, wherein the ejector comprises an actuation face to engage with an actuation ramp of the device feature to move the device feature from the cam face to the cam ramp.

12. The device hinge of claim 6, wherein the device feature is a control panel of an imaging device.

13. An imaging device, comprising:
 a control panel to nest within a cradle of the printing device in a stowed position, and to pivot out of the cradle in an ejected position; and
 a device hinge to switchably dispose the control panel in the stowed position and in the ejected position, the device hinge comprising:
  a hinge member to rotatably engage the control panel with the imaging device about a pivot point, the control panel to rotate about the pivot point to switch from the stowed position to the ejected position;
  a cam element disposed within the cradle, the cam element comprising:
   a cam ramp; and
   a cam face to engage with the control panel in the stowed position;
  an ejector to move the lock face from the cam face to the cam ramp; and
  a bias member to move the control panel up the cam ramp, relative to the hinge member, to the ejected position upon the ejector moving the lock face from the cam face to the cam ramp.

14. The printing device of claim 13, wherein an edge of the control panel and an edge of the cradle define a clearance gap when the control panel is in the ejected position.

* * * * *